US006461499B1

(12) United States Patent
Bosman

(10) Patent No.: US 6,461,499 B1
(45) Date of Patent: Oct. 8, 2002

(54) HYDROCYCLONE WITH REMOVAL OF MISPLACED COARSE FRACTION IN OVERFLOW

(75) Inventor: Jeremy Brett Bosman, Kempton Park (ZA)

(73) Assignee: Multotec Process Equipment (Proprietary) Limited, Kempton Park (ZA)

( * ) Notice: Subject to any disclaimer, the term of this patent is extended or adjusted under 35 U.S.C. 154(b) by 0 days.

(21) Appl. No.: 09/507,026

(22) Filed: Feb. 18, 2000

(30) Foreign Application Priority Data

Feb. 22, 1999 (ZA) ............................................ 99/1387

(51) Int. Cl.[7] .......................... B01D 21/26; B01D 21/24

(52) U.S. Cl. .................... 210/112; 210/512.1; 210/788; 209/715; 209/721; 209/725; 209/732; 55/459.1

(58) Field of Search .............................. 210/512.1, 112, 210/788; 209/715, 721, 725, 732; 55/459.1

(56) References Cited

U.S. PATENT DOCUMENTS 5,240,115 A * 8/1993 Crossley et al. ......... 210/512.1
6,109,451 A * 8/2000 Grimes .................... 210/512.1

* cited by examiner

*Primary Examiner*—David A. Reifsnyder
(74) *Attorney, Agent, or Firm*—Fish & Richardson P.C.

(57) ABSTRACT

A hydrocyclone has an inlet head, one or more chambers located beneath the inlet head and terminating in an underflow outlet, a vortex finder located within the inlet head, and an overflow outlet connected to the vortex finder. The overflow outlet has a peripheral annular zone therein that receives coarse particles in the overflow issuing from the vortex finder, and a secondary outlet communicates with the annular zone.

5 Claims, 6 Drawing Sheets

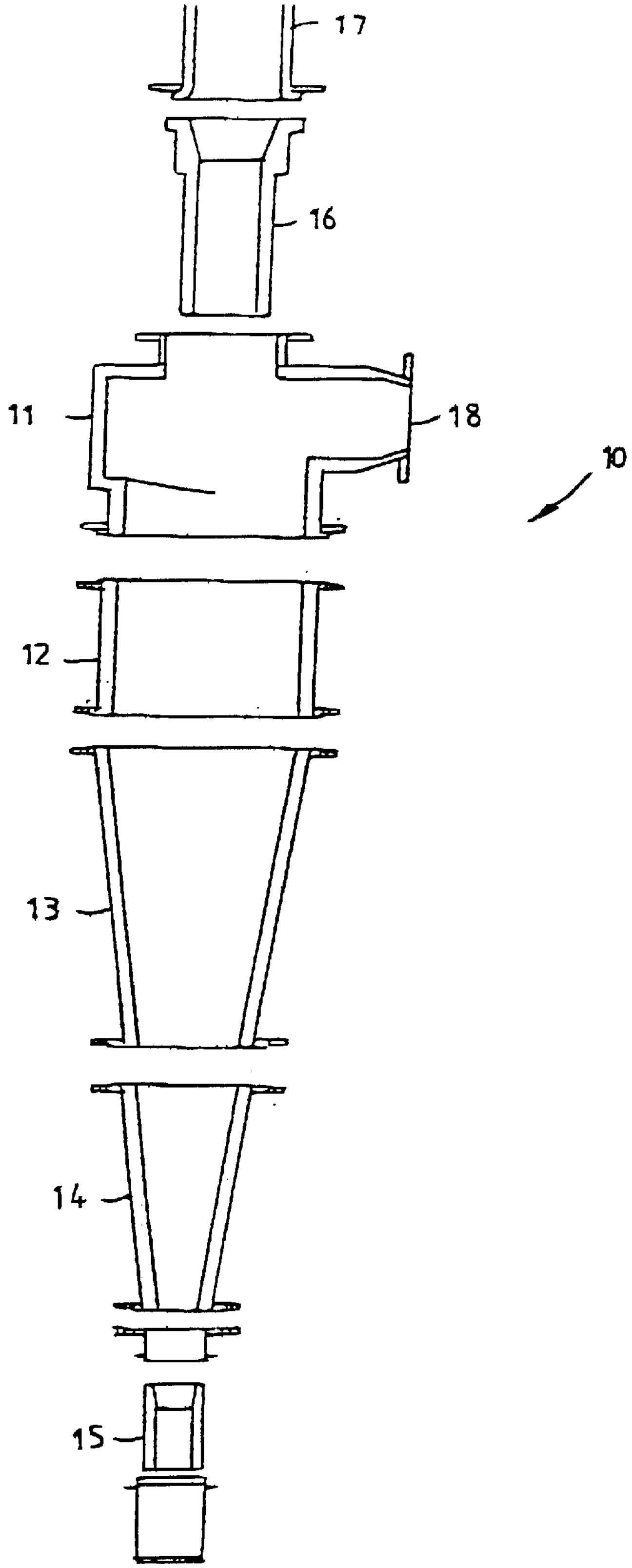
FIGURE A
(PRIOR ART)

HYDROCYCLONE WITH REMOVAL OF MISPLACED COARSE FRACTION IN OVERFLOW

FIELD OF INVENTION

This invention relates to hydrocyclones.

BACKGROUND ART

Hydrocyclones are widely used in the mineral processing industry for classification, de-watering and de-sliming of mineral pulps and slurries and generally for separating coarse and fine fractions of such pulps and slurries. One problem which is encountered with hydrocyclones is that a misplaced coarse fraction often occurs in the overflow of the hydrocyclone issuing from its vortex finder, which means that the overflow may have to be subjected to further treatment in order to remove the misplaced coarse fraction.

OBJECT OF THE INVENTION

It is accordingly an object of the invention to provide a hydrocyclone which seeks to overcome the above problem or which at least provides a useful improvement over prior art hydrocyclones.

BRIEF SUMMARY OF THE INVENTION

According to the invention a hydrocyclone comprises an inlet head, one or more chambers located beneath the inlet head and terminating in an underflow outlet, a vortex finder located within the inlet head and an overflow outlet connected to the vortex finder, wherein the overflow outlet has a peripheral annular zone therein which receives coarse particles in the overflow outlet issuing from the vortex finder, and a secondary outlet communicating with such annular zone.

Preferably, the annular zone is formed by a double wall formation, comprising an inner wall and an outer wall which is radially outwardly spaced from the inner wall to define an annular space between the inner wall and outer wall, with the second overflow outlet communicating with such annular space. In one arrangement, the annular zone is of a double wall frusto-conical structure which tapers outwardly in a is downstream direction.

Preferably also the send overflow outlet will communicate with the annular zone towards the downstream end thereof.

The secondary outlet preferably has adjustable valve means provided therein to control the rate of flow therethrough.

BRIEF DESCRIPTION OF DRAWINGS

An embodiment of the invention will now be described by way of example with reference to the accompanying drawings in which;

FIG. A is an exploded cross-sectional elevation of a typical prior at hydrocyclone;

Figure 8:
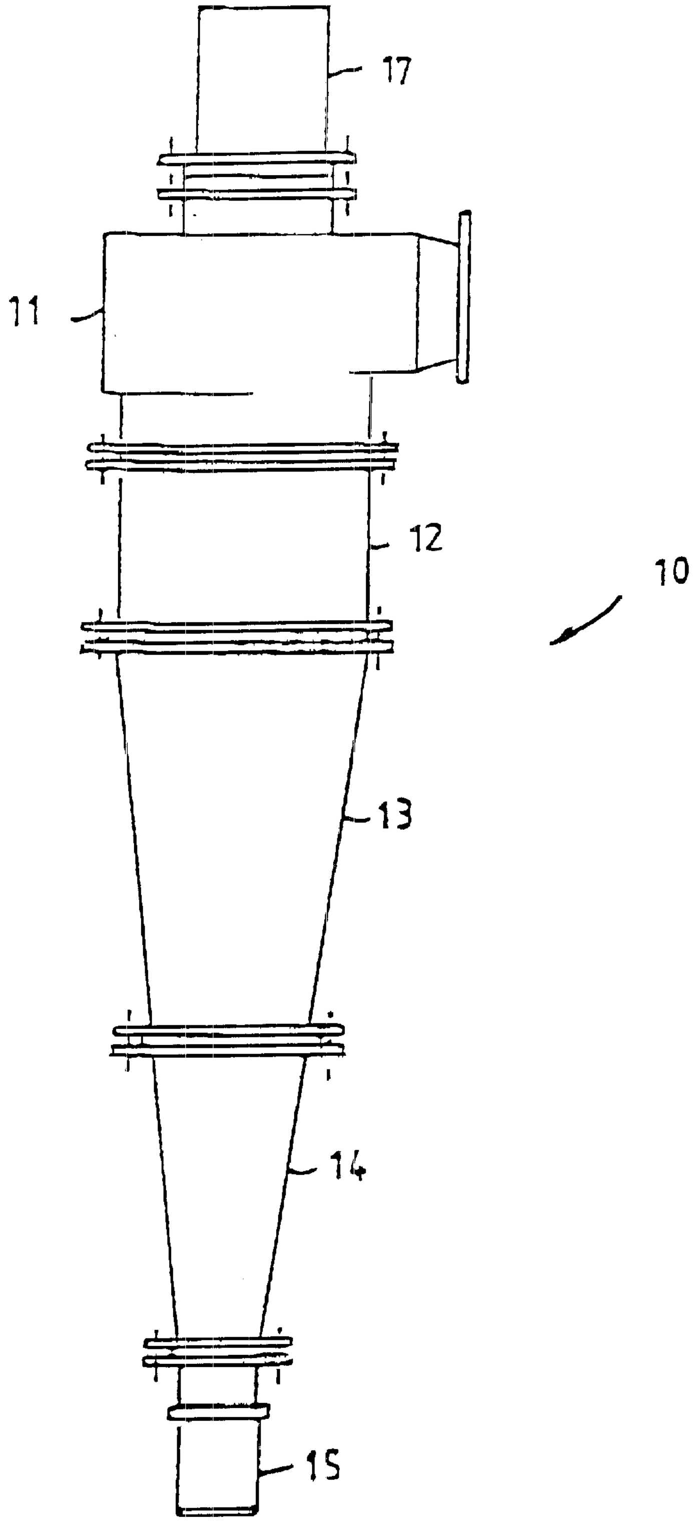
FIGURE 8 (PRIOR ART)
Figure 1:
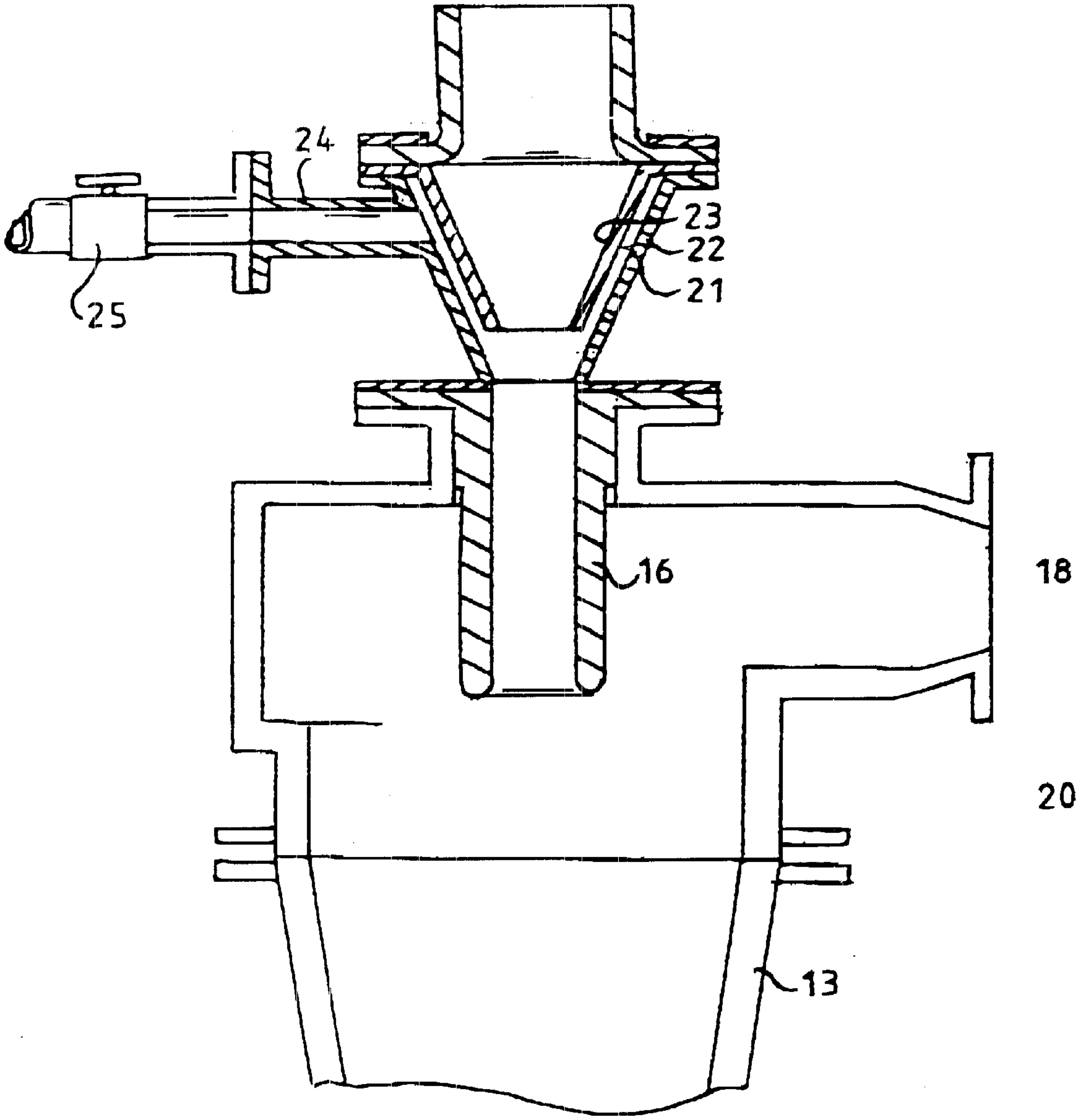
Figure 2:
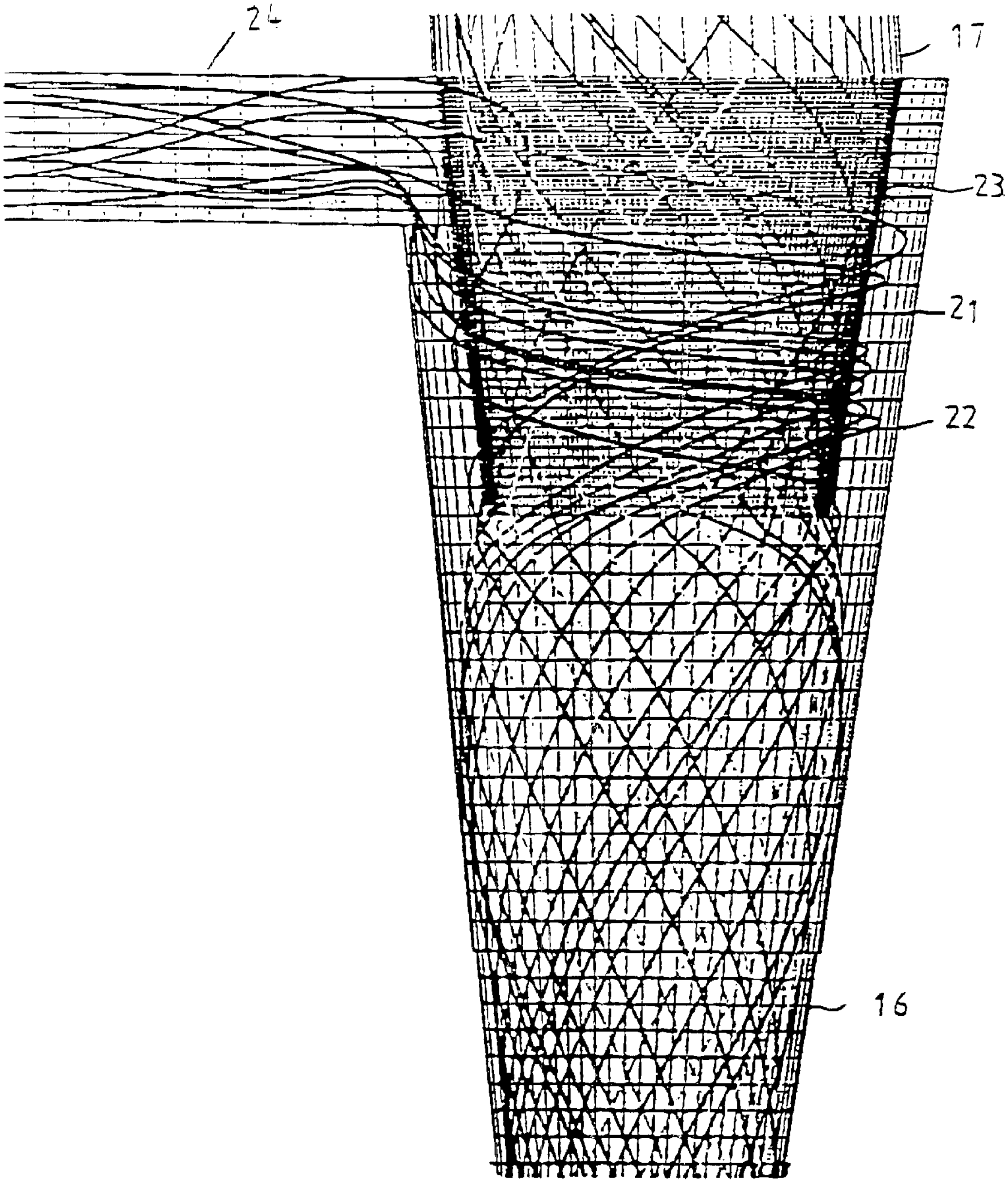
Figure 3:
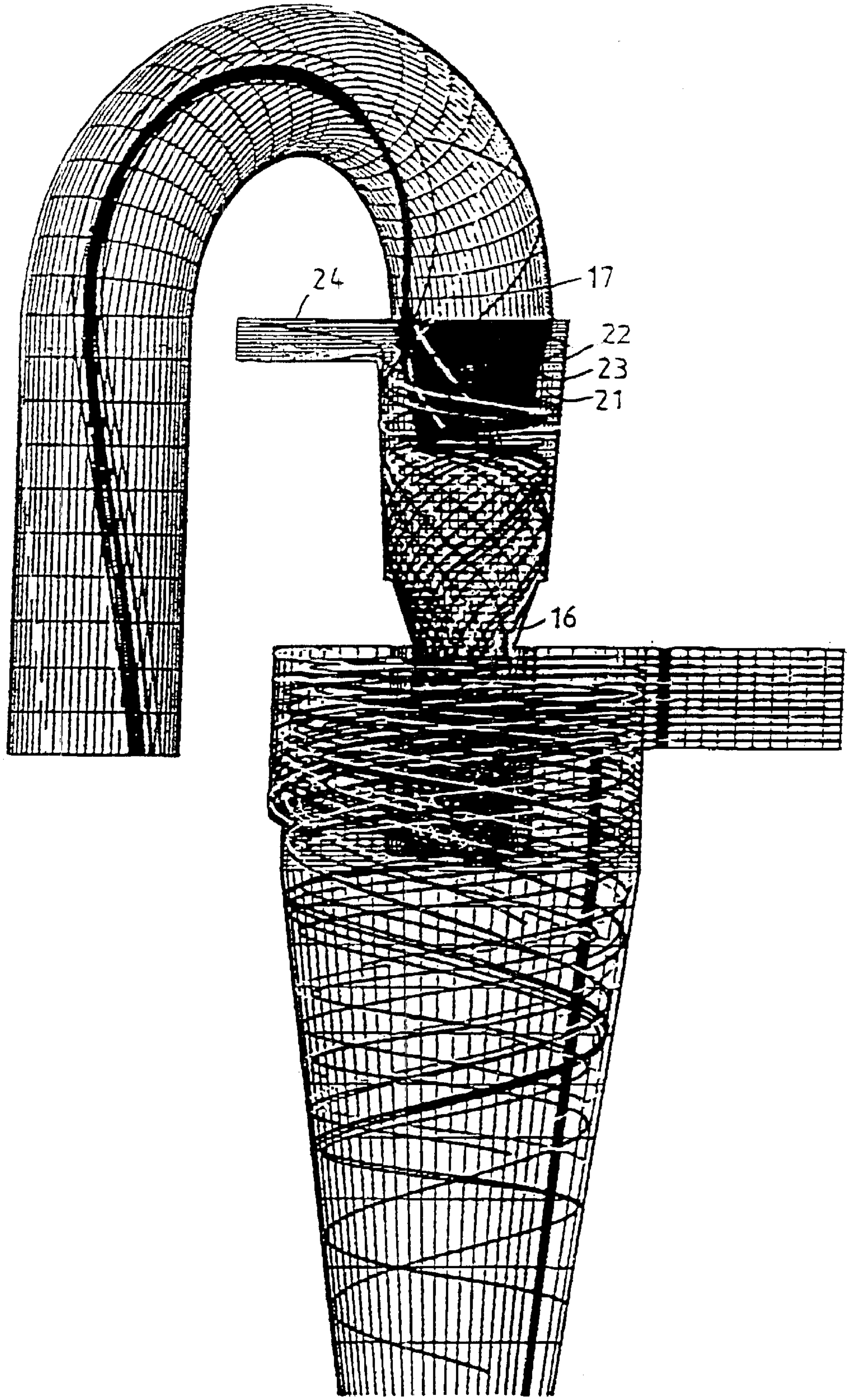
Figure 4:
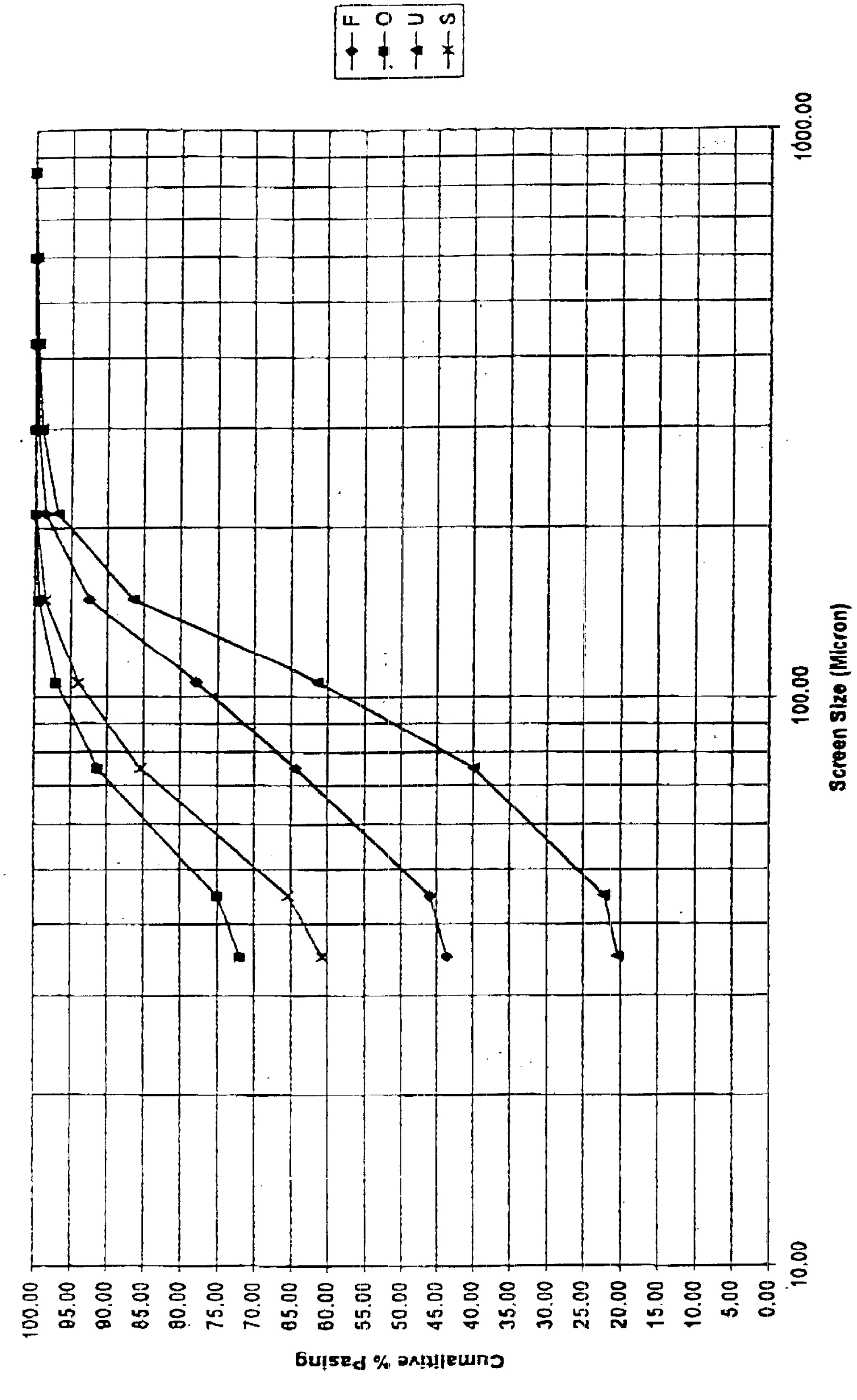

FIG. B is an elevation of the hydrocyclone of FIG. A in assembled form;

FIG. 1 is a cross-sectional elevation of a hydrocyclone similar to the prior art hydrocyclone of FIGS. A and B and incorporating the invention;

FIGS. 2 and 3 are computer simulated representations of flow patterns through the overflow outlet and through the hydrocyclone of FIG. 1 respectively; and FIG. 4 is a graphical representation of performance of the hydrocyclone of the invention.

DETAILED DESCRIPTION OF THE INVENTION

With reference to FIGS. A and B a typical hydrocyclone 10 is shown which comprises an inlet head 11, a barrel 12 below the inlet head and consecutive cones 13, 14 extending beneath the barrel 12 and terminating in an underflow outlet spigot 15. Located with the inlet head is a vortex finder 16 to which an overflow outlet 17 is connected. In use the prior art hydrocyclone 10 receives mineral pulp or slurry through an inlet 18 of the inlet head 11 and the operation of the cyclone results in a coarse underflow fraction of the slurry or pulp issuing through the underflow spigot 15 and a fine overflow fraction issuing through the overflow outlet 17.

With reference to FIGS. 1 to 3, a hydrocyclone 20 is shown of similar construction to the prior art hydrocyclone 10 of FIGS. A and B. In the hydrocyclone 20 of FIGS. 1 to 3 like parts are designated with like numbers shown in FIGS. A and B.

It is a special feature of the invention that the overflow outlet 17 of the hydrocyclone 20 is constructed to provide a peripheral annular zone therein designated by numeral 21. The zone 21 in this embodiment of the invention is defined by a double wall structure consisting of an outer wall 22 and an inner wall 23, both of frusto conical shape. The zone 21 communicates with a secondary outlet 24 having an adjustable valve 25 provided therein. As shown in FIGS. 1 to 3, the double wall structure tapers radially outwardly in the direction of flow through the overflow outlet 17. With this arrangement, the zone 21 thus assumes an increasing diameter in the downstream direction. Preferably the secondary outlet 24 will communicate with the annular zone 21 in the area where the zone 21 has its largest diameter.

In use, mineral pulp or slurry is fed through the inlet 18 of the hydrocyclone 20 resulting in a coarse underflow fraction reporting to the underflow spigot 15 and a fine overflow fraction issuing through the vortex finder 16. Within the fine overflow fraction coarse particles which occur and which tend to be located towards the radial extremity of the fine overflow fraction issuing from the vortex finder 16 pass through the zone 21 and exit through the secondary outlet 24. In this way at least a portion of the misplaced coarse fraction in the overflow fraction issuing through the vortex finder 16 is removed therefrom for disposal or further treatment.

Performance results of trials with the hydrocyclone of the invention, are shown is graphically in FIG. 4. With reference to FIG. 4, four graphs are plotted, and reflect the particle size profile of the infeed, and the various outputs. The X-axis of the graph shows screen size in microns; and Y-axis the accumulative percentage passing through such screen size.

In FIG. 4, the following graphs are represented;

F=the particle size profile of the infeed through the inlet 18 of the hydrocyclone;

U=is the course underflow fraction which issues through the underflow spigot 15;

O=is the primary fine overflow fraction which passes through the main passage of the overflow outlet 17; and S=is a coarser overflow fraction which passes through the annular zone and exists through the secondary outlet 24.

From the graphs, it will be noted that a coarser fraction of the overflow an be trapped, and withdrawn through the secondary outlet 24. The primary fine overflow fraction represented by the graph O, is thus to a large extent separated from any misplaced coarse fraction in the overflow.

FIG. 2 is a computer simulation compiled by the applicant indicating the flow pattern of particles issuing through the vortex finder 16 of the hydrocyclone 20. Whilst the majority of particles pass through the main passage of the overflow outlet 17, it is seen that a proportion of particles pass through the zone 21 and exit through the secondary outlet 24. These particles include the coarse unwanted particles which are thus removed from the overflow stream.

Thus the invention provides a useful advance over prior art hydrocyclones.

Many other embodiments of the invention may be made differing in detail only from that described above and without departing from the scope of the invention defined in the appended claims.

What is claimed is:

1. A hydrocyclone comprising an inlet head, a tubular body extending from the inlet head to an underflow outlet for coarse material and defining one or more chambers located beneath the inlet head, a vortex finder located within the inlet head, and an overflow outlet for fine material connected to the vortex finder, wherein the overflow outlet has a peripheral annular zone therein that receives misplaced coarse particles in the overflow outlet issuing from the vortex finder, and a secondary overflow outlet for misplaced coarse particles communicating with the peripheral annular zone.

2. The hydrocyclone according to claim 1 wherein the annular zone is formed by a double wall formation, comprising an inner wall and an outer wall which is radially outwardly spaced from the inner wall to define an annular space between the inner wall and outer wall, with the secondary overflow outlet communicating with the annular space.

3. The hydrocyclone according to claim 2 wherein the double wall formation is a frusto-conical structure that tapers outwardly in a downstream direction.

4. The hydrocyclone according to claim 2 wherein the secondary overflow outlet communicates with the double wall formation towards a downstream end thereof.

5. A hydrocyclone according to claim 1 wherein the secondary outlet includes an infinitely adjustable valve adapted to be progressively opened and progressively closed for controlling the rate of flow through the secondary outlet.

* * * * *